US012634220B2

(12) United States Patent
Miyoshi et al.

(10) Patent No.: US 12,634,220 B2
(45) Date of Patent: May 19, 2026

(54) CONVERSION DEVICE, CONVERSION METHOD, AND CONVERSION PROGRAM

(71) Applicant: NTT, Inc., Tokyo (JP)

(72) Inventors: Yuki Miyoshi, Musashino (JP); Yuhei Hayashi, Musashino (JP); Chiharu Morioka, Musashino (JP); Takeaki Nishioka, Musashino (JP); Shohei Kamamura, Musashino (JP)

(73) Assignee: NTT, Inc., Tokyo (JP)

( * ) Notice: Subject to any disclaimer, the term of this patent is extended or adjusted under 35 U.S.C. 154(b) by 420 days.

(21) Appl. No.: 18/277,352

(22) PCT Filed: Feb. 16, 2021

(86) PCT No.: PCT/JP2021/005779
§ 371 (c)(1),
(2) Date: Aug. 15, 2023

(87) PCT Pub. No.: WO2022/176035
PCT Pub. Date: Aug. 25, 2022

(65) Prior Publication Data
US 2024/0129221 A1 Apr. 18, 2024

(51) Int. Cl.
*H04L 43/50* (2022.01)
*H04L 69/22* (2022.01)

(52) U.S. Cl.
CPC .............. *H04L 43/50* (2013.01); *H04L 69/22* (2013.01)

(58) Field of Classification Search
CPC ....... H04L 43/50; H04L 69/22; H04L 41/142; H04L 41/0806; H04L 43/022; H04L 43/18; G06F 8/423
See application file for complete search history.

(56) References Cited

U.S. PATENT DOCUMENTS

| | | | | |
|---|---|---|---|---|
| 10,880,197 | B2 * | 12/2020 | Naskar | G06F 8/41 |
| 2019/0116127 | A1 * | 4/2019 | Pismenny | H04L 63/0272 |
| 2020/0244582 | A1 * | 7/2020 | Li | H04L 45/02 |
| 2021/0266193 | A1 * | 8/2021 | Bijjala | H04L 43/028 |
| 2021/0303588 | A1 * | 9/2021 | Thomas | G06F 9/3001 |
| 2021/0409299 | A1 * | 12/2021 | Florian | H04L 12/4633 |

(Continued)

OTHER PUBLICATIONS

Miyoshi et al., "Hardware Offload Optimization with Metadata Utilization for Fast xFlow Proxy," 2021 General Conference of the Institute of Electronics, Information and Communication Engineers, online, Mar. 3-9, 2021, 3 pages (with machine translation).

(Continued)

*Primary Examiner* — Schquita D Goodwin
(74) *Attorney, Agent, or Firm* — Fish & Richardson P.C.

(57) ABSTRACT

A conversion device analyzes information of an input packet using hardware and determines whether to perform predetermined previous stage processing using the hardware. Furthermore, when it is determined to perform the previous stage processing, the conversion device uses the hardware to provide metadata including identification information indicating a group of packets to the packets on the basis of the fixed-length header information of the packets. In addition, the conversion device uses software to generate analysis packets corresponding to the group of packets using the provided metadata.

6 Claims, 11 Drawing Sheets

(56) References Cited

U.S. PATENT DOCUMENTS

| | | | |
|---|---|---|---|
| 2022/0094613 A1* | 3/2022 | Wang | H04L 43/10 |
| 2023/0300051 A1* | 9/2023 | Song | H04L 41/04 |
| | | | 370/252 |

OTHER PUBLICATIONS

Miyoshi et al. "Format Changing Method for Header Sample in Flow Information Packet," Proceedings of 2020 IEICE General Conference, Higashihiroshima, Japan, Mar. 17-20, 2020, 3 pages (with machine translation).

* cited by examiner

[ENCAPSULATED PACKET]
EXAMPLES:L2TP PACKET

FIRST Ether HEADER

FIRST IPv4/IPv6 HEADER

UDP HEADER

L2TP HEADER

PPP HEADER

SECOND IPv4/IPv6 HEADER

Data

HARDWARE PROCESSING

SOFTWARE PROCESSING

Fig. 5

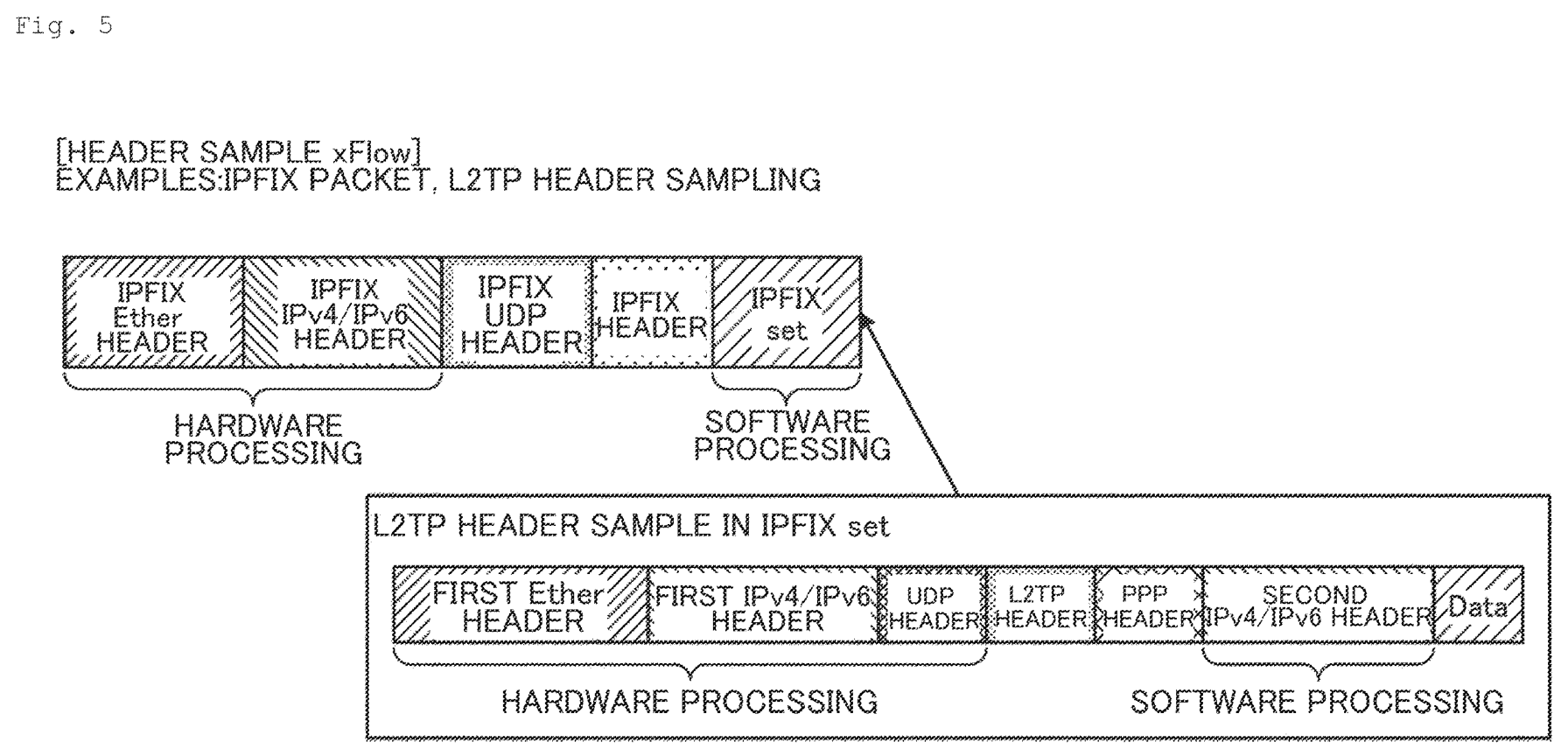

[HEADER SAMPLE xFlow]
EXAMPLES:IPFIX PACKET, L2TP HEADER SAMPLING

IPFIX Ether HEADER | IPFIX IPv4/IPv6 HEADER | IPFIX UDP HEADER | IPFIX HEADER | IPFIX set

HARDWARE PROCESSING

SOFTWARE PROCESSING

L2TP HEADER SAMPLE IN IPFIX set

FIRST Ether HEADER | FIRST IPv4/IPv6 HEADER | UDP HEADER | L2TP HEADER | PPP HEADER | SECOND IPv4/IPv6 HEADER | Data

HARDWARE PROCESSING

SOFTWARE PROCESSING

Fig. 6

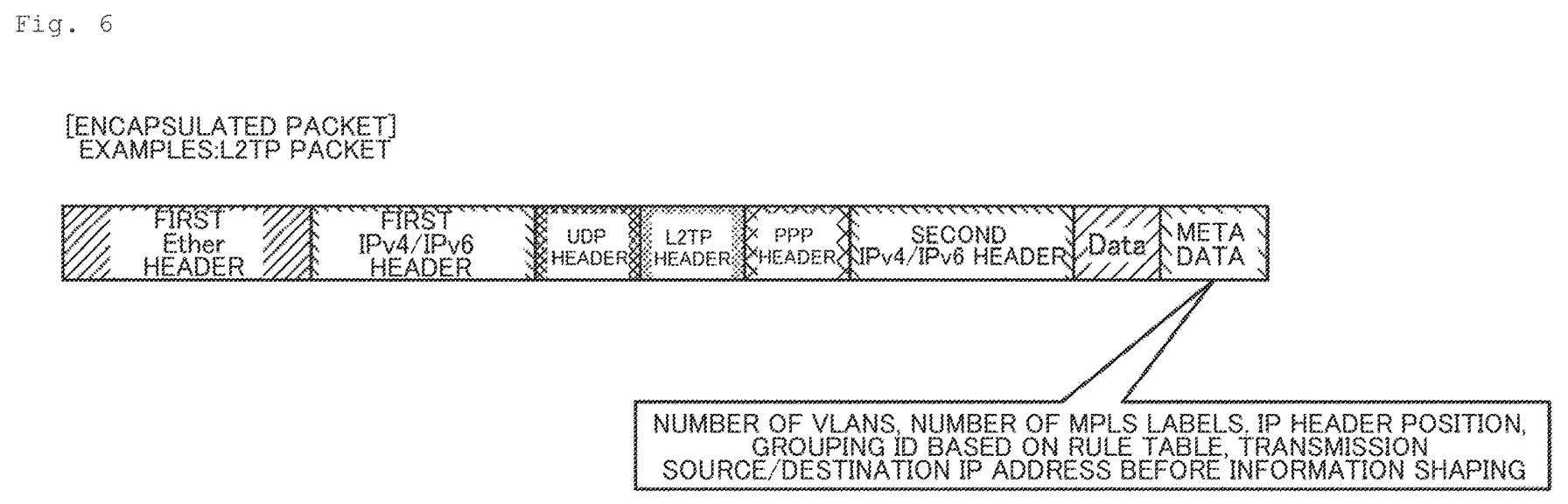

[ENCAPSULATED PACKET]
EXAMPLES:L2TP PACKET

| FIRST Ether HEADER | FIRST IPv4/IPv6 HEADER | UDP HEADER | L2TP HEADER | PPP HEADER | SECOND IPv4/IPv6 HEADER | Data | META DATA |
|---|---|---|---|---|---|---|---|

NUMBER OF VLANS, NUMBER OF MPLS LABELS, IP HEADER POSITION, GROUPING ID BASED ON RULE TABLE, TRANSMISSION SOURCE/DESTINATION IP ADDRESS BEFORE INFORMATION SHAPING

Fig. 7

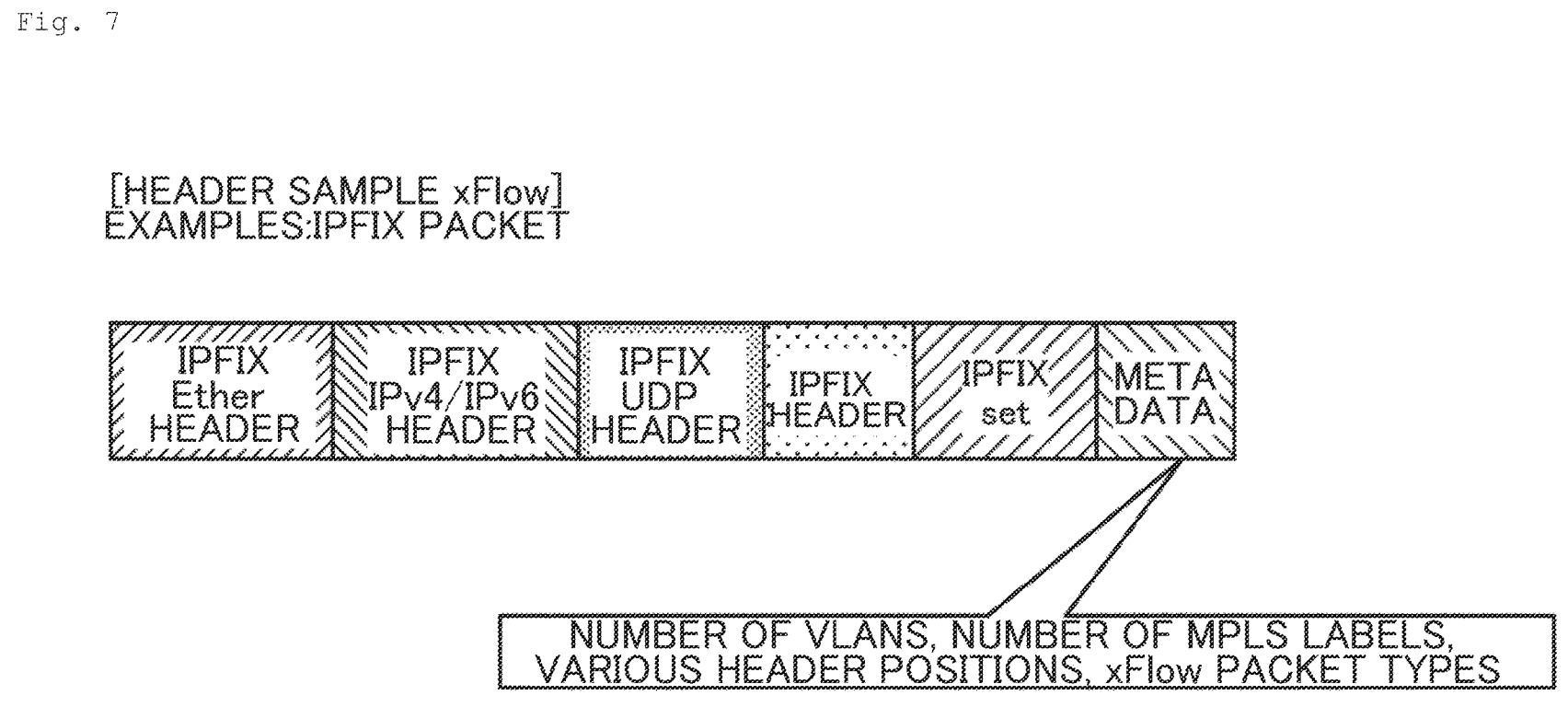

[HEADER SAMPLE xFlow]
EXAMPLES:IPFIX PACKET

| IPFIX Ether HEADER | IPFIX IPv4/IPv6 HEADER | IPFIX UDP HEADER | IPFIX HEADER | IPFIX set | META DATA |

NUMBER OF VLANS, NUMBER OF MPLS LABELS, VARIOUS HEADER POSITIONS, xFlow PACKET TYPES

CONVERSION DEVICE, CONVERSION METHOD, AND CONVERSION PROGRAM

CROSS-REFERENCE TO RELATED APPLICATIONS

This application is a National Stage application under 35 U.S.C. § 371 of International Application No. PCT/JP2021/005779, having an International Filing Date of Feb. 16, 2021, the disclosure of which is considered part of the disclosure of this application, and is incorporated by reference in its entirety into this application.

TECHNICAL FIELD

The present invention relates to a conversion device, a conversion method, and a conversion program.

BACKGROUND ART

There is an xFlow technique of performing packing sampling for network monitoring and traffic trend analysis and aggregating and analyzing traffic by transferring flow statistical information calculated from header information and a header itself (header sample).

Also, as a technique of analyzing an encapsulated packet, there is a format conversion technique of allowing a packet inside a capsule to be extracted and analyzed in a RAW packet and a header sample xFlow packet. Furthermore, there is a technique of registering, in a database, the correspondence between a packet header inside a capsule and a packet header outside the capsule for an encapsulated packet.

CITATION LIST

Non Patent Literature

[NPL 1] Miyoshi and the like, "Header Sample Format Conversion Method in xFlow Packet", 2020 IEICE General Conference, B-6-36, March 2020

SUMMARY OF INVENTION

Technical Problem

However, a format conversion technique in the related art has a problem that it is not possible to perform flexible processing at high speed which varies in accordance with the attributes of the business operator or the like. For example, a format conversion technique in the related art can only perform uniform processing according to an encapsulation format of an input packet and cannot branch processing depending on the contents of the packet headers inside and outside the capsule. Thus, there is a problem that it is not possible to perform different processing or analysis for each attribute of a business operator or the like for encapsulated packets on a network which is used by a plurality of business operators. In addition, with the format conversion technique in the related art, it is difficult to process a large amount of traffic at high speed using software.

The present invention was made in view of the above circumferences, and an object of the present invention is to provide a conversion device, a conversion method, and a conversion program capable of performing flexible processing at high speed which is different for each attribute of a business operator or the like.

Solution to Problem

In order to solve the above problem and to achieve the object, a conversion device of the present invention includes: an analysis unit configured to analyze information of an input packet using hardware and determine whether predetermined previous stage processing using the hardware is to be performed; a provision unit configured to perform, using the hardware, a process of providing metadata including identification information indicating a group of the packet to the packet on the basis of fixed-length header information in the packet when the analysis unit determines to perform the previous stage processing; and a generation unit configured to use software to generate analysis packets corresponding to the group of packets using the metadata provided by the provision unit.

Also, a conversion method of the present invention is a conversion method performed by a conversion device including: an analysis step of analyzing information of an input packet using hardware and determining whether predetermined previous stage processing using the hardware is to be performed; a provision step of performing, using the hardware, a process of providing metadata including identification information indicating a group of the packet to the packet on the basis of fixed-length header information in the packet when the analysis step determines to perform the previous stage processing; and a generation step of using software to generate analysis packets corresponding to the group of packets using the metadata provided using the provision step.

Moreover, a conversion program of the present invention causes a computer to execute: an analysis step of analyzing information of an input packet using hardware and determining whether predetermined previous stage processing using the hardware is to be performed; a provision step of performing, using the hardware, a process of providing metadata including identification information indicating a group of the packet to the packet on the basis of fixed-length header information in the packet when the analysis step determines to perform the previous stage processing; and a generation step of using software to generate analysis packets corresponding to the group of packets using the metadata provided using the provision step.

Advantageous Effects of Invention

According to the present invention, it is possible to perform flexible processing at high speed which is different for each attribute of a business operator or the like.

BRIEF DESCRIPTION OF DRAWINGS

FIG. 5 is a diagram illustrating hardware and software processing portions in an xFlow packet including header samples.

FIG. 6 is a diagram illustrating attachment of metadata to an encapsulated packet.

FIG. 7 is a diagram for explaining addition of metadata to an xFlow packet including a header sample.

DESCRIPTION OF EMBODIMENTS

Embodiments of a conversion device, a conversion method, and a conversion program according to the present application will be described below in detail with reference to the drawings. Moreover, the present invention is not limited to the embodiments which will be described below.

Embodiment

First, an embodiment will be described. A conversion device 10 according to the embodiment off-loads some processing to previous stage hardware, performs packet analysis using the hardware, performs a determination concerning whether to perform hardware processing or subsequent stage software processing, and as the result of analysis performed using the previous stage hardware, writes metadata including grouping information to an end of a packet. Also, the conversion device 10 identifies metadata in subsequent stage software and replaces protocol analysis/grouping processing, thereby linking hardware and software. Thus, the conversion device 10 can off-load a part of the processing to hardware to reduce the amount of processing on the software side and perform flexible processing different for each attribute of a business operator or the like at high speed.

[Configuration of Communication System]

Figure 1:
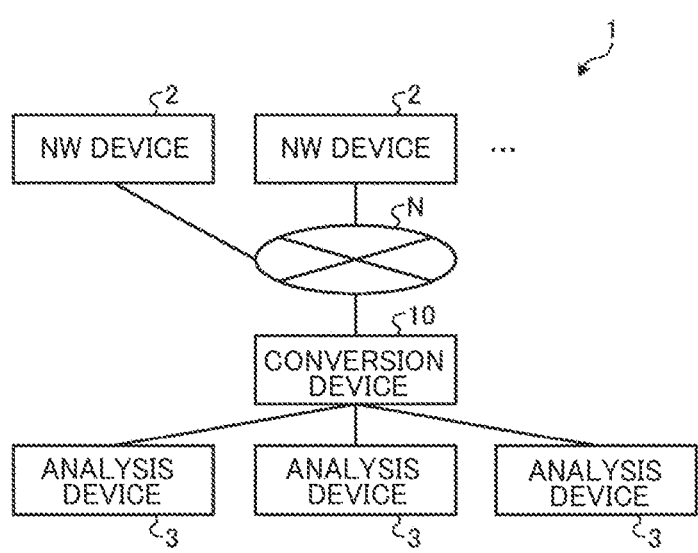
FIG. 1 is a block diagram illustrating an example of a configuration of a communication system according to an embodiment.

FIG. 1 is a block diagram illustrating an example of a configuration of a communication system according to the embodiment. As shown in FIG. 1, a communication system 1 according to the embodiment includes a plurality of NW devices 2, a conversion device 10, and a plurality of analysis devices 3 (external devices). For example, the plurality of NW devices 2 and the conversion device 10 communicate with each other via a network N. Note that the configuration shown in FIG. 1 is merely an example and the specific configuration and the numbers of each device are not particularly limited.

Each of the NW devices 2 samples packets in traffic to be monitored. The NW device 2, for example, may transfer a mirrored encapsulated packet to the conversion device 10 and may cut sampled packet header samples and transfer an xFlow packet obtained by encapsulating the cut header samples to the conversion device 10. At this time, the NW device 2 may transfer statistical information about a flow such as the number of packets to the conversion device 10 by adding it to the xFlow packet to be transferred or as another xFlow packet.

The conversion device 10 converts xFlow packets input from various NW devices 2 into xFlow packets having a format corresponding to the processing content of the external analysis device 3. Specifically, the conversion device 10 identifies header information using protocol analysis and performs grouping on the basis of conditions. Also, the conversion device 10 performs processing defined for each group and transmits the generated packet to the analysis device 3. For example, as processing defined for each group, the conversion device 10 obtains statistics of inner headers of xFlow packets input from various NW devices 2, generates an xFlow packet including at least statistical information indicating the obtained statistics of the inner header, and transmits the generated xFlow packet to the external analysis device 3.

Each analysis device 3 analyzes the traffic to be monitored and aggregates the packets in the traffic to be monitored. For example, the analysis device 3 uses the statistical information included in the xFlow packets converted by the conversion device 10 to perform analysis and aggregation.

Figure 2:
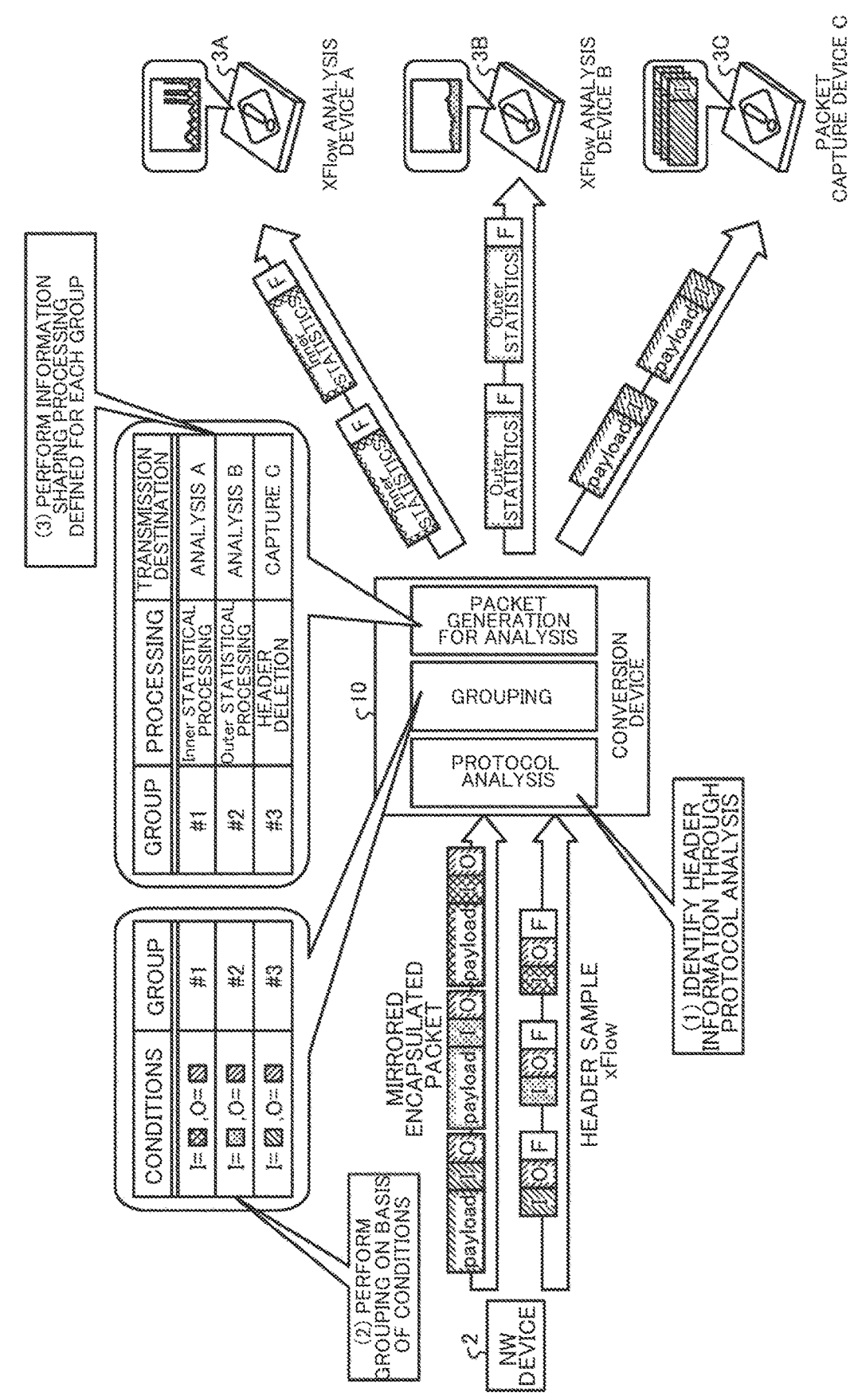
FIG. 2 is a diagram for explaining a flow of processing in a conversion device shown in FIG. 1.

The conversion device 10 performs flexible format conversion processing based on packet header information. Here, the flow of format conversion processing in the conversion device will be described with reference to FIG. 2. FIG. 2 is a diagram for explaining the flow of processing in the conversion device shown in FIG. 1. Note that, in the description provided herein, the description of the process of offloading some processing to hardware is omitted, a description concerning whether it is hardware or software processing is not provided, and the overall flow of format conversion processing by the conversion device 10 will be described. Furthermore, the processing for off-loading a part of the processing to the hardware or the like will be described later.

As illustrated in FIG. 2, upon receiving an input of an encapsulated packet mirrored by the NW device 2 or an xFlow packet including a header sample, the conversion device 10 identifies header information by protocol analysis (refer to (1) in FIG. 2).

Also, the conversion device 10 groups the input packets on the basis of the grouping conditions (refer to (2) of FIG. 2). The example of FIG. 2 exemplifies a case in which the conversion device 10 classifies a packet into one of a plurality of groups "Groups #1 to #3" on the basis of conditions regarding both the outer header and the inner header.

Subsequently, the conversion device 10 performs processing defined for each group (refer to (3) in FIG. 2). For example, in the example of FIG. 2, the conversion device 10 obtains inner header statistics for packets classified into Group "#1" and generates xFlow packets including at least statistical information indicating the inner header statistics. Furthermore, the conversion device 10 transmits the generated xFlow packet using xFlow analysis device 3A (also described as transmission destination "analysis A" in FIG. 2) as a transmission destination.

Also, for example, the conversion device 10 obtains statistics of inner headers for packets classified into Group "#2" and generates xFlow packets including at least statistical information indicating the statistics of the inner headers. Furthermore, the conversion device 10 transmits the generated xFlow packet using the xFlow analysis device 3B (also described as transmission destination "analysis B" in FIG. 2) as a transmission destination.

Also, for example, the conversion device 10 removes the outer header from the packets classified into Group "#3" and generates (shapes) the packets using the transmission destination rewritten to the external analysis device 3. Furthermore, the conversion device 10 transmits the generated packet using a packet capture device 3C (also described as transmission destination "capture C" in FIG. 2) as a transmission destination. Note that the conversion device 10 may generate and transmit a packet at any timing for each of the processes described above.

For example, when performing statistical processing like processing corresponding to Groups "#1" and "#2", the conversion device 10 performs statistical processing to generate and transmit packets when the number of grouped packets reaches a predetermined number. Also, for example, the conversion device 10 generates and transmits a packet each time it is grouped into Group "#3" when removing the outer header and rewriting the transmission destination to the external analysis device 3 as in the processing corresponding to Group "#3".

That is, the conversion device 10 can group input packets and perform different processing for each group, such as deleting the capsule outer packet header, statistical processing, and changing the transmission destination IP address, thereby flexibly performing individual processing and analysis for each attribute of the network use business operator or the like.

Furthermore, the conversion device 10 can reduce the amount of processing on the software side by off-loading a part of the processing to hardware and make it possible to perform flexible processing at high speed, which differs for each attribute of a business operator or the like.

[Configuration of Conversion Device]

Figure 3:
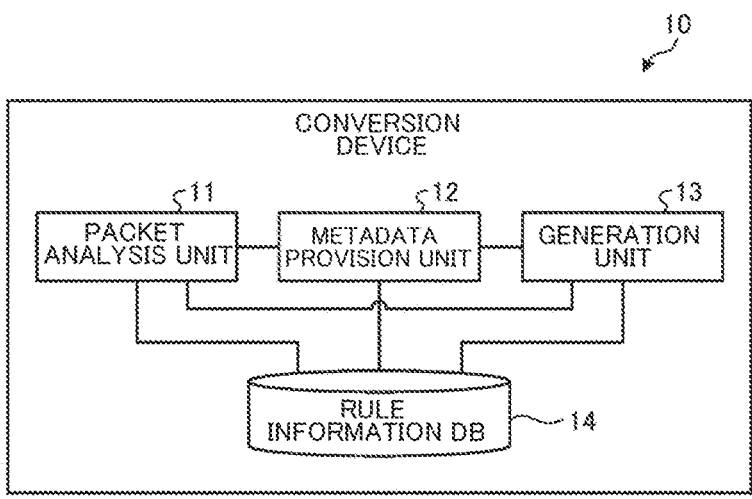
FIG. 3 is a block diagram illustrating an example of a configuration of the conversion device illustrated in FIG. 1.

The configuration of the conversion device 10 will be described below. FIG. 3 is a block diagram illustrating an example of the configuration of the conversion device 10 shown in FIG. 1.

As shown in FIG. 3, the conversion device 10 includes a packet analysis unit 11, a metadata provision unit 12, a generation unit 13, and a rule information DB 14. Note that the conversion device 10 is implemented using a predetermined program which is read into a computer or the like including a read only memory (ROM), a random access memory (RAM), a central processing unit (CPU), or the like and in which the CPU executes the predetermined program. Furthermore, the conversion device 10 has a communication interface for transmitting and receiving various information to and from another device connected via a network or the like. For example, the conversion device 10 has a network interface card (NIC) or the like and performs communication with other devices via electric communication lines such as a local area network (LAN) and the Internet.

The rule information DB 14 includes preset rules and stores rules for determining whether to off-load a part of the processing in the previous stage hardware. For example, the rule information DB 14 stores packets for which predetermined previous stage processing is performed by hardware (hardware off-load target packets), packets for which software processing is performed without performing predetermined previous stage processing by hardware (non-hardware off-load packets), or a packet which is not an analysis target (packet which is not an analysis target) in accordance with the information of either one or both of the outer header and the inner header of the input packet.

Also, the rule information DB 14 stores rules for identifying hardware processing portions and software processing portions in packets. For example, the rule information DB 14 stores rules for identifying a hardware processing portion and a software processing portion for each packet type.

Also, the rule information DB 14 stores grouping conditions for grouping input packets as grouping conditions. Moreover, for example, the rule information DB 14 stores, as grouping conditions, conditions regarding information contained in either one or both of the outer header and the inner header.

Also, the rule information DB 14 stores processing defined for each group. That is, the rule information DB 14 stores the details of the processing to be performed for each group for each grouped packet. For example, the rule information DB 14 stores the processing content and the destination of the generated analysis packet in association with the group ID. Note that the information stored in the rule information DB 14 described above is set in advance by an operator and can be changed, added, or deleted as appropriate.

The packet analysis unit 11 analyzes the information of the input packet by hardware and determines whether to perform predetermined previous stage processing by the hardware. For example, when receiving an input of an encapsulated packet (RAW packet) or an xFlow packet including a header sample which is the header portion itself, the packet analysis unit 11 performs protocol analysis on the encapsulated packet or the xFlow packet using hardware.

Also, for example, the packet analysis unit 11 may determine whether predetermined previous stage processing using hardware is to be performed and whether the packet is not an analysis target and may discard the packet when it determines that the packet is not to be analyzed. That is, the packet analysis unit 11 refers to the rules stored in the rule information DB 14 and determines whether the input packet is a hardware off-load target packet, a packet which is not hardware off-load or a packet which is not an analysis target.

As a result, for example, the packet analysis unit 11 causes the generation unit 13 (software) to perform the following processing when it is determined to be a packet which is not hardware off-load. Also, when the packet analysis unit 11 determines that the packet is a packet which is not an analysis target, the packet analysis unit 11 discards the packet.

Also, for example, the packet analysis unit 11 refers to information stored in the rule information DB 14 when it is determined that the packet is a hardware off-load target packet, identifies the hardware processing portion and the software processing portion in the packet, and causes the metadata provision unit 12 (hardware) to perform the following processing.

Figure 4:
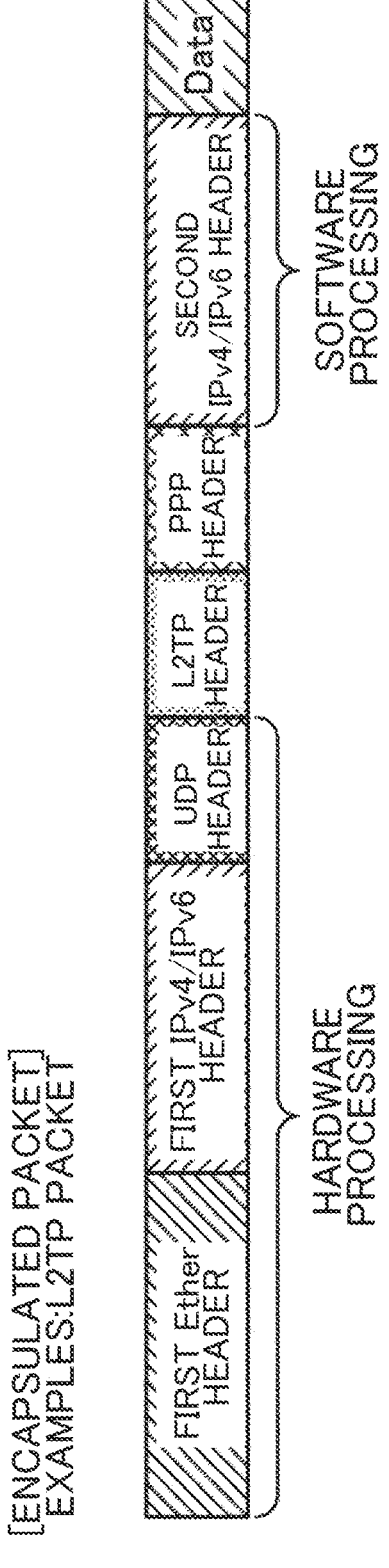
FIG. 4 is a diagram illustrating a hardware processing portion and a software processing portion in an encapsulated packet.

Here, for example, as illustrated in FIG. 4, when receiving an input of an L2TP packet which is an encapsulated packet, the packet analysis unit 11 identifies the "first Ether header", the "first IPv4/IPv6 header", and the "user datagram protocol (UDP) header" as hardware processing portions and identifies the "second IPv4/IPv6 header" as the software processing portion. FIG. 4 is a diagram for explaining the hardware processing portion and the software processing portion in the encapsulated packet. For example, the information in the fixed-length header outside the capsule can be easily determined even if it is processed in hardware, so it is processed using hardware. Furthermore, for example, the information in the variable-length header and the information in the header inside the capsule needs to be read in units of bits, and is processed using hardware.

Also, for example, as illustrated in FIG. 5, when receiving an input of an IPFIX packet which is an xFlow packet including a header sample, the packet analysis unit 11 identifies the "IPFIX Ether header" and "IPFIX IPv4/IPv6 header" and the "first Ether header", "first IPv4/IPv6 header" and "UDP header" in the L2TP header sampling in the IPFIX set as the hardware processing portions and identifies the "second IPv4/IPv6 header" in L2TP header sampling as the software processing portion. FIG. 5 is a diagram for explaining a hardware processing portion and a software processing portion in an xFlow packet including a header sample.

Providing the explanation with reference to FIG. 3 again, when the packet analysis unit 11 determines that the previous stage processing is to be performed, the metadata provision unit 12 uses hardware to add metadata including identification information indicating the group of the input packet to the input packet on the basis of the information in the fixed-length header of the input packet.

For example, the metadata provision unit 12 refers to the rules stored in the rule information DB 14, acquires the information in the header identified as the hardware processing portion by the packet analysis unit 11, performs the grouping on the basis of the information in the header to determine the grouping ID, and uses hardware to add metadata including the grouping ID to the packet. Also, for example, the metadata provision unit 12 performs information shaping processing to change the source IP address of the packet to the IP address of the conversion device 10 and the destination IP address to the IP address of the analysis device 3.

Subsequently, the metadata provision unit 12 provides metadata according to the rule on the basis of the information in the header identified as the hardware processing portion. For example, the metadata includes a protocol analysis result such as a protocol type and a header length of each header and a grouping primary identification result.

Here, the process of adding metadata will be described using the examples of FIGS. 6 and 7. FIG. 6 is a diagram for explaining the provision of metadata to the encapsulated packet. FIG. 7 is a diagram for explaining the provision of metadata to an xFlow packet including a header sample. As illustrated in FIG. 6, for example, the metadata provision unit 12 provides, to the L2TP packet, metadata including "number of VLANs", "number of MPLS labels", "IP header position", "grouping ID based on rule table", and "transmission source IP address and destination IP address before information shaping".

Furthermore, as illustrated in FIG. 7, the metadata provision unit 12 provides, to the IPFIX packet, metadata including "number of VLANs", "number of MPLS labels", "various header positions" and "xFlow packet type".

When predetermined previous stage processing using hardware is performed, the generation unit 13 uses the metadata provided by the metadata provision unit 12 to perform a process of generating analysis packets corresponding to the packet group using software. For example, the generation unit 13 acquires a grouping ID included in the metadata provided by the metadata provision unit 12 and refers to the rule information DB 14 to determine processing corresponding to the grouping ID.

Furthermore, when the predetermined previous stage processing using hardware is not performed, the generation unit 13 performs packet protocol analysis processing and grouping processing using software, and then performs processing corresponding to the group to generate packets. Subsequently, the generation unit 13 transmits the generated packet to the analysis device 3. For example, the generation unit 13 obtains statistics of inner headers as processing for generating analysis packets corresponding to groups, obtains the process of generating an xFlow packet containing at least statistical information indicating the statistics of the inner header and the statistics of the outer header, removes the process of generating xFlow packets containing at least statistical information indicating the statistics of the inner header and the outer header, and performs one or more of the processes of generating (shaping) a packet whose transmission destination has been rewritten to the external analysis device 3. Note that the process of generating packets by the generation unit 13 includes a process of generating a new analysis packet and a process of rewriting or deleting the information of the input packet to shape it into a analysis packet.

Figure 8:
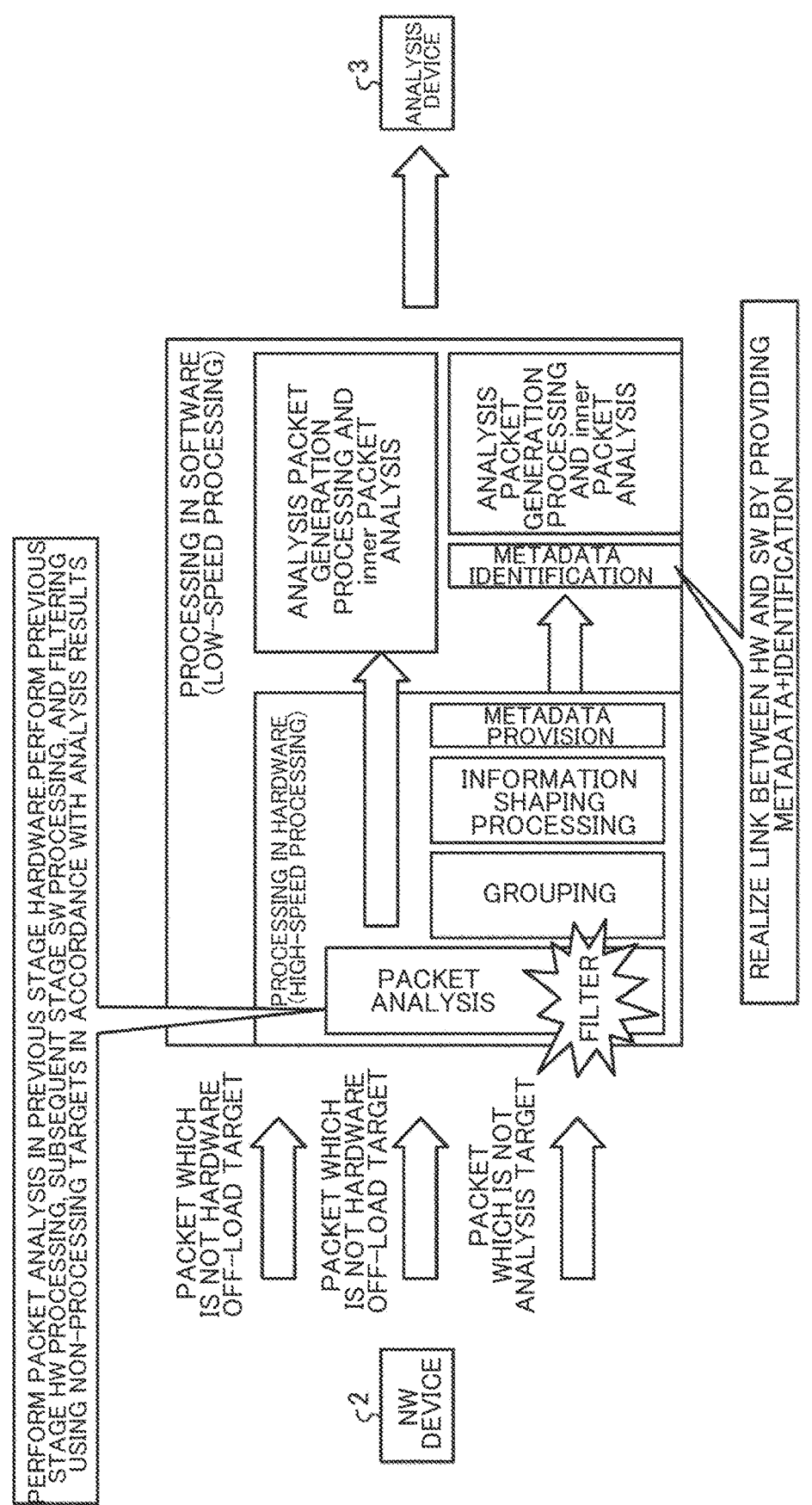
FIG. 8 is a diagram for explaining a flow of processing in the conversion device shown in FIG. 1.

Here, the flow of processing in the conversion device shown in FIG. 1 will be described with reference to FIG. 8. FIG. 8 is a diagram for explaining the flow of processing in the conversion device shown in FIG. 1. Note that, in the example of FIG. 8, as processing for generating analysis packets, a case will be described in which the statistics of the inner header are obtained and an xFlow packet including statistical information indicating the statistics of the inner header is generated.

As illustrated in FIG. 8, upon receiving a packet input, the hardware of the conversion device 10 determines whether the input packet is a hardware off-load target packet, a hardware off-load non-packet, or a packet which is not an analysis target. That is, the conversion device 10 performs packet analysis in the previous stage hardware and performs the previous stage hardware processing, subsequent stage software processing, or filtering processing using a packet which is not a processing target based on the results of the analysis.

For example, when the subsequent stage software processing is performed without the previous stage hardware processing, the conversion device 10 performs packet protocol analysis processing and grouping processing using software as processing in the software and acquires statistics of the inner header as processing corresponding to the group, and performs processing for generating an xFlow packet including at least statistical information indicating inner header statistics.

Also, when performing the previous stage hardware processing, the conversion device 10 performs grouping on the basis of the information in the header as processing in the hardware, performs information shaping processing to change the transmission source IP address and the destination IP address, and then provides metadata according to the rules on the basis of the information in the header identified as the hardware processing portion.

Subsequently, the conversion device 10 identifies the metadata provided in the hardware internal processing as the software internal processing and determines the processing content using the grouping ID included in the metadata. Also, the conversion device 10, as processing in the software, analyzes the inner header to acquire statistics of the inner header and performs processing of generating an xFlow packet including at least statistical information indicating the statistics of the inner header.

In this way, the conversion device 10 writes metadata including the analysis result and grouping information performed by the previous stage hardware to the end of the packet. Moreover, the conversion device 10 can link hardware and software by substituting metadata identification processing for protocol analysis and grouping processing in the subsequent stage software.

In the conversion device 10, the previous stage hardware performs processing in which hardware is good at, such as uniform processing, and in the subsequent stage software, flexible decisions and complex processing, such as processing based on the information inside the encapsulated packet, can be performed, thereby reducing the amount of processing on the software side and speeding up even large-volume traffic.

Figure 9:
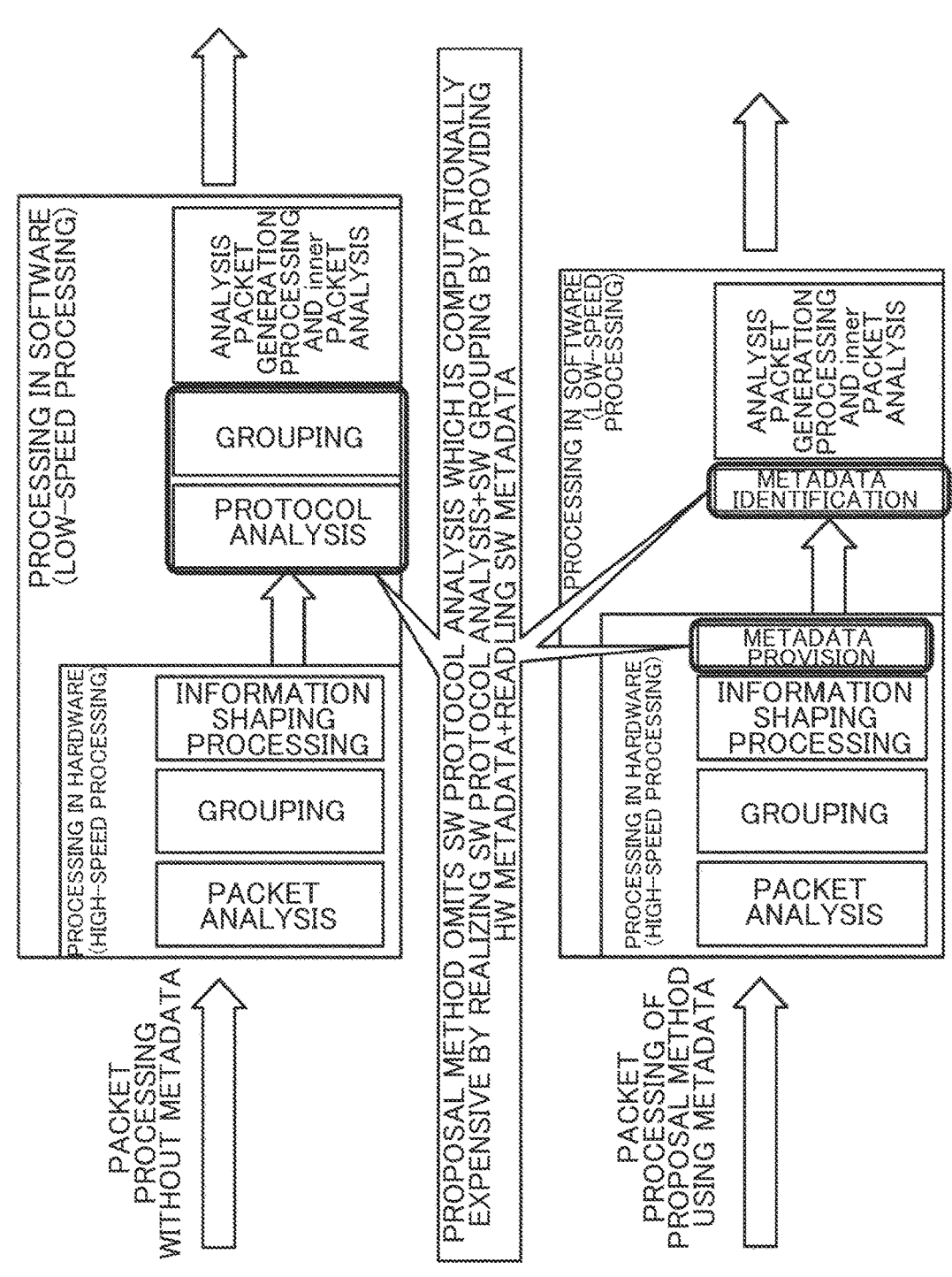
FIG. 9 is a diagram for explaining an effect of the conversion device shown in FIG. 1.

Here, the effect of the conversion device shown in FIG. 1 will be described with reference to FIG. 9. FIG. 9 is a diagram for explaining the effect of the conversion device shown in FIG. 1. In the example of FIG. 9, packet processing which does not use metadata and packet processing of the proposed method of the embodiment which uses metadata are compared. In the case of packet processing which does not use metadata, subsequent stage software performs protocol analysis and grouping processing.

On the other hand, in the packet processing of the proposed method of the embodiment using metadata, previous stage hardware performs packet analysis and provides metadata including grouping information and subsequent stage software performs metadata reading instead of protocol analysis, which is computationally expensive, and identifies the results of hardware processing.

That is, computationally expensive software protocol analysis can be omitted by realizing protocol analysis processing and grouping processing in software with metadata provision processing in hardware and metadata reading processing in software. Therefore, it is possible to reduce the amount of processing on the software side by off-loading some processing to hardware.

[Processing Procedure of Conversion Processing]

Figure 10:
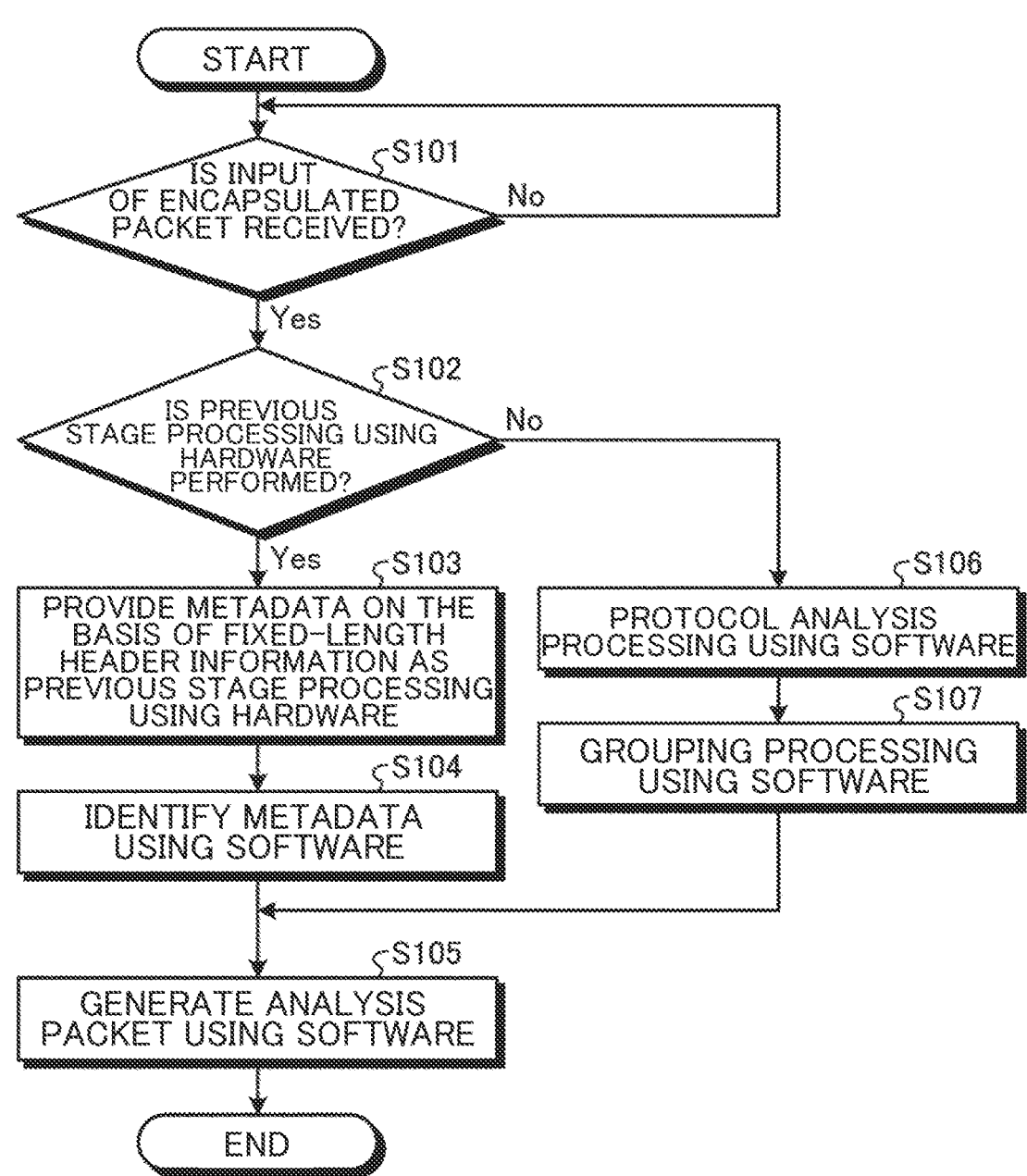
FIG. 10 is a flowchart for describing an example of a processing procedure of conversion processing according to the embodiment.

A processing procedure of packet conversion processing performed by the conversion device 10 will be described below. FIG. 10 is a flowchart for describing an example of a processing procedure of conversion processing according to the embodiment.

As shown in FIG. 10, when receiving an input of a packet (Step S101; affirmation), the packet analysis unit 11 of the conversion device 10 analyzes the information of the input packet using hardware and determines whether to perform previous stage processing using hardware (Step S102).

As a result, when the packet analysis unit 11 determines that the information of the inputted packet is to be analyzed using hardware (Step S102; affirmation), the metadata provision unit 12 provides metadata on the basis of the information in the fixed-length header as previous stage processing using hardware (Step S103). Subsequently, the generation unit 13 identifies the metadata using software (Step S104) and generates an analysis packet using software in accordance with the grouping ID included in the metadata (Step S105).

Also, in Step S102, when the packet analysis unit 11 determines that the information of the input packet is to be analyzed using hardware (Step S102; negative), the generation unit 13 performs protocol processing using software (Step S106) and performs grouping processing using software (Step S107). Subsequently, the generation unit 13 generates an analysis packet using software in accordance with the grouping result (Step S105).

Effects of Embodiment

As described above, the conversion device 10 according to the embodiment analyzes the information of the input packet using hardware and determines whether to perform predetermined previous stage processing using hardware. Also, when it is determined to perform the previous stage processing, the conversion device 10 uses the hardware to provide metadata including identification information indicating a group of packets to the packets on the basis of the fixed-length header information of the packets. Moreover, the conversion device 10 uses software to generate analysis packets corresponding to a group of packets using the provided metadata. Therefore, the conversion device 10 can perform flexible processing different for each attribute of a business operator or the like at a high speed.

That is, the conversion device 10 writes metadata including the analysis result obtained through the execution using the previous stage hardware and the grouping information to the end of the packet. Also, the conversion device 10 can link hardware and software by substituting metadata identification processing for protocol analysis and grouping processing in subsequent stage software. Therefore, in the conversion device 10, it is possible to increase the volume of processable traffic while reducing the amount of processing on the software side.

About System Configuration of Embodiment

Each constituent element of the conversion device 10 shown in FIG. 1 is functionally conceptual and necessarily need not to be physically configured as shown. That is, the specific modes of distribution and integration of the functions of the conversion device 10 are not limited to those shown in the drawing and all or a part thereof can be functionally or physically distributed or integrated in arbitrary units according to various loads and usage conditions.

Also, each process performed in the conversion device 10 may be implemented entirely or in part by a CPU and a program which is analyzed and executed by the CPU. Also, each process performed in the conversion device 10 may be realized as hardware by wired logic.

In addition, of the processes described in the embodiments, all or a part of the processes described as being automatically performed can also be performed manually. Alternatively, all or a part of the processes described as being performed manually can be performed automatically by known methods. Besides, the above-described and illustrated processing procedures, control procedures, specific names, and information including various data and parameters can be changed as appropriate unless otherwise specified.

[Program]

Figure 11:
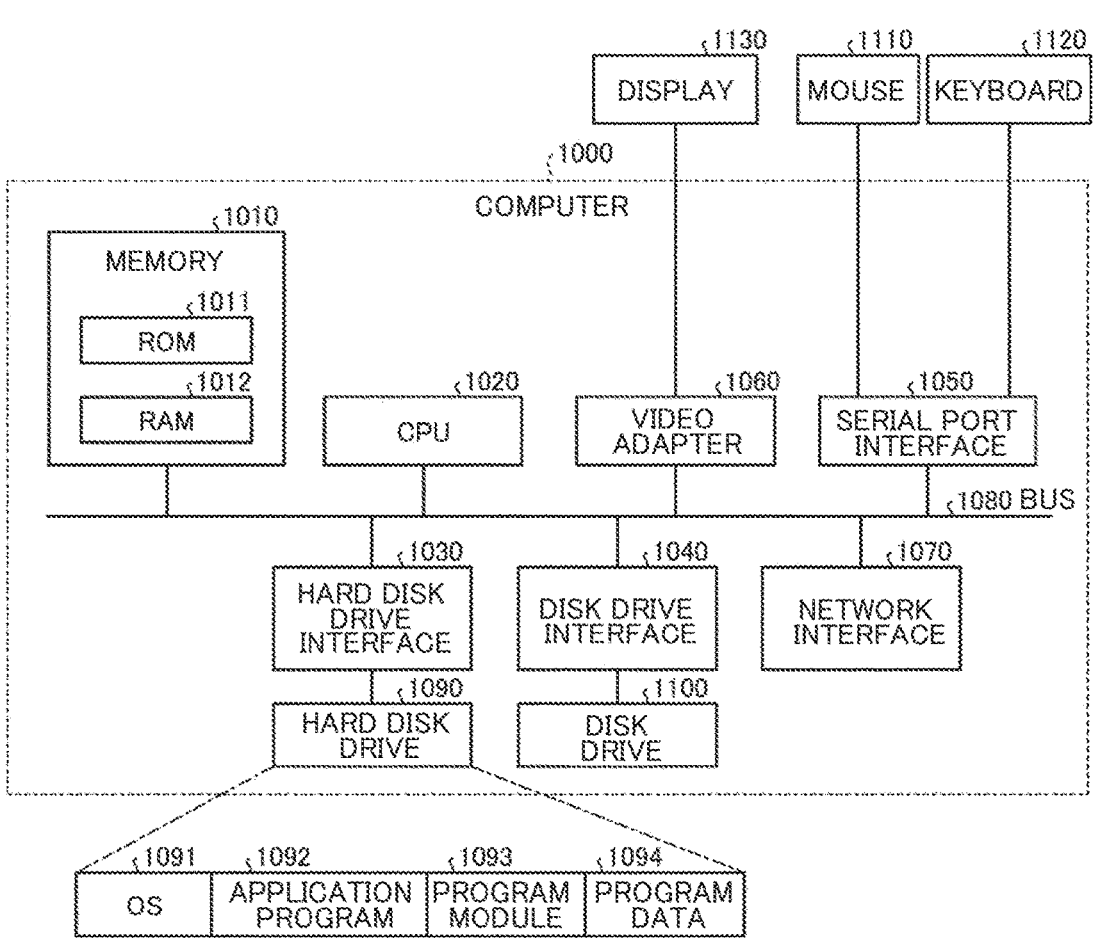
FIG. 11 is a diagram illustrating an example of a computer which implements a conversion device by executing a program.

FIG. 11 is a diagram illustrating an example of a computer which implements the conversion device 10 by executing a program. A computer 1000 includes, for example, a memory 1010 and a CPU 1020. Also, the computer 1000 has a hard disk drive interface 1030, a disk drive interface 1040, a serial port interface 1050, a video adapter 1060, and a network interface 1070. These units are connected by a bus 1080.

A memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program which defines each process of the conversion device 10 is implemented as a program module 1093 in which a code which can be executed using the computer 1000 is described. The program module 1093 is stored in, for example, the hard disk drive 1090. For example, the hard disk drive 1090 stores a program module 1093 for performing processing similar to the functional configuration in the conversion device 10. Note that the hard disk drive 1090 may be replaced with a solid state drive (SSD).

Furthermore, the setting data used in the processing of the above-described embodiment is stored, for example, in the memory 1010 or the hard disk drive 1090 as the program data 1094. Also, the CPU 1020 reads the program module 1093 and the program data 1094 stored in the memory 1010 or the hard disk drive 1090 into the RAM 1012 and performs them as necessary.

Note that the program module 1093 and the program data 1094 are not limited to being stored in the hard disk drive 1090 and may be stored in a removable storage medium, for example, and read using the CPU 1020 via disk drive 1100 or the like. Alternatively, the program module 1093 and the program data 1094 may be stored in another computer connected via a network (local area network (LAN), a wide area network (WAN), or the like). Moreover, the program module 1093 and the program data 1094 may be read using the CPU 1020 via the network interface 1070 from other computers.

Although the embodiments to which the invention made by the present inventor is applied have been described above, the present invention is not limited by the descriptions and drawings forming part of the disclosure of the present invention according to the embodiments. That is, other embodiments, examples, operation techniques, and the like made by those skilled in the art on the basis of the embodiment are all included in the scope of the present invention.

REFERENCE SIGNS LIST

1 Communication system
2 NW device
3 Analysis device
10 Conversion device
11 Packet analysis unit
12 Metadata provision unit
13 Generation unit
14 Rule information DB
The invention claimed is:

1. A conversion device comprising:
an analysis unit, implemented using one or more computing devices, configured to:
analyze information of an input packet using hardware, and
determine whether predetermined previous stage processing using the hardware is to be performed;
a provision unit, implemented using one or more computing devices, configured to, based on the analysis unit being determined to perform the predetermined previous stage processing, perform, using the hardware, a process of providing metadata including identification information indicating a group of the packet to the packet on the basis of fixed-length header information in the packet; and
a generation unit, implemented using one or more computing devices, configured to generate analysis packets corresponding to the group of packets using the metadata provided by the provision unit,
wherein the generation unit is configured to:
acquire statistics of inner headers as processing for generating analysis packets corresponding to the group, obtain a process of generating a packet including at least statistical information indicating statistics of the inner header and statistics of an outer header,
remove a process of generating a packet including at least statistical information indicating statistics of the inner header and the outer header, and
perform one or more processes of generating a packet whose transmission destination is rewritten to an external analysis device.

2. The conversion device according to claim 1, wherein the analysis unit is configured to:
determine whether the predetermined previous stage processing using the hardware is to be performed,
determine whether the packet is not an analysis target, and
discard, based on a determination that the packet is not the analysis target, the packet.

3. The conversion device according to claim 1, wherein the analysis unit is configured to identify a hardware processing portion and a software processing portion in the packet, and
wherein the provision unit is configured to:
acquire information in a header identified as the hardware processing portion by the analysis unit,
perform grouping on the basis of the information in the header to determine the identification information, and
perform a process of providing metadata including the identification information to the packet using the hardware.

4. The conversion device according to claim 1, wherein the generation unit is configured to:
analyze the packet and acquire header information included in the packet based on predetermined previous stage processing using the hardware not being performed,
perform classification into one of a plurality of groups on the basis of the header information and a set grouping condition, and
generate the analysis packets on the basis of processing corresponding to the classified groups.

5. A conversion method performed by a conversion device, comprising:
analyzing information of an input packet using hardware and determining whether predetermined previous stage processing using the hardware is to be performed;
performing, based on the predetermined previous stage processing being determined to be performed, using the hardware, a process of providing metadata including identification information indicating a group of the packet to the packet on the basis of fixed-length header information in the packet; and
generating analysis packets corresponding to the group of packets using the provided metadata,
wherein generating analysis packets comprises:
acquiring statistics of inner headers as processing for generating analysis packets corresponding to the group,
obtaining a process of generating a packet including at least statistical information indicating statistics of the inner header and statistics of an outer header,
removing a process of generating a packet including at least statistical information indicating statistics of the inner header and the outer header, and
performing one or more processes of generating a packet whose transmission destination is rewritten to an external analysis device.

6. A non-transitory recording medium storing a conversion program, wherein execution of the conversion program causes a computer to perform operations comprising:

analyzing information of an input packet using hardware and determining whether predetermined previous stage processing using the hardware is to be performed;

performing, based on the predetermined previous stage processing being determined to be performed, using the hardware, a process of providing metadata including identification information indicating a group of the packet to the packet on the basis of fixed-length header information in the packet; and generating analysis packets corresponding to the group of packets using the provided metadata, wherein generating analysis packets comprises:

acquiring statistics of inner headers as processing for generating analysis packets corresponding to the group, obtaining a process of generating a packet including at least statistical information indicating statistics of the inner header and statistics of an outer header, removing a process of generating a packet including at least statistical information indicating statistics of the inner header and the outer header, and performing one or more processes of generating a packet whose transmission destination is rewritten to an external analysis device.

\* \* \* \* \*